INVENTORS
Henry A. Straus
Forrest H. Murray &
Persa R. Bell, Jr.
BY
ATTORNEY

Patented Mar. 4, 1952

2,587,919

UNITED STATES PATENT OFFICE 2,587,919

ELECTRICAL APPARATUS FOR SIMULATING THE TIME DEPENDENT RESPONSE CHARACTERISTIC OF NEUTRONIC REACTORS

Henry A. Straus, Baltimore, Md., and Persa R. Bell, Jr., and Forrest H. Murray, Oak Ridge, Tenn., assignors to the United States of America as represented by the United States Atomic Energy Commission Application November 28, 1949, Serial No. 129,719

7 Claims. (Cl. 235—61)

This invention relates generally to the problem of controlling neutronic reactors, and more particularly to an electrical instrument adapted to simulate or reproduce the time-dependent response characteristic of a neutronic reactor.

As is well known, a most difficult and critical problem in the design and operation of a neutron reactor is that of properly controlling the power level or neutron density. This is particularly true when the reactor under consideration is intended to operate at a high neutron flux and power level. Such a reactor must have originally built into it a substantial amount of excess reactivity in order to overcome the loss of reactivity which will occur during operation as a result of the build up of fission products and the depletion of fissionable material.

This excess reactivity, when not needed, is, of course, "held" or cancelled out by the insertion of control rods. It is immediately apparent that the presence of this large amount of excess reactivity introduces the possibility of the reactor power level getting completely out of control and rising exponentially with a period so small that the reactor may burn itself up before it can be shut down. Such a reactor must be controlled very carefully, and preferably automatically, to insure that dangerous conditions do not occur.

The object of the present invention is to provide an electrical device which has the same time-dependent response characteristic as a reactor, that is, a device wherein an electric parameter, such as a voltage, varies with time in exactly the same manner as does the neutron density of a reactor. Such a device has innumerable uses in connection with the design and operation of a reactor. Among these uses are: (1) establishing procedures for start-up, shut-down, and operation of a reactor; (2) training of manual operators in such procedure; (3) design and testing of servo systems and other components of automatic reactor control systems; (4) studies of response of the reactor to unusual disturbances; and (5) obtaining information as to power levels which would be attained should the reactor get out of control of the normal control equipment and be eventually shut down by the emergency safety equipment.

Figure 1:
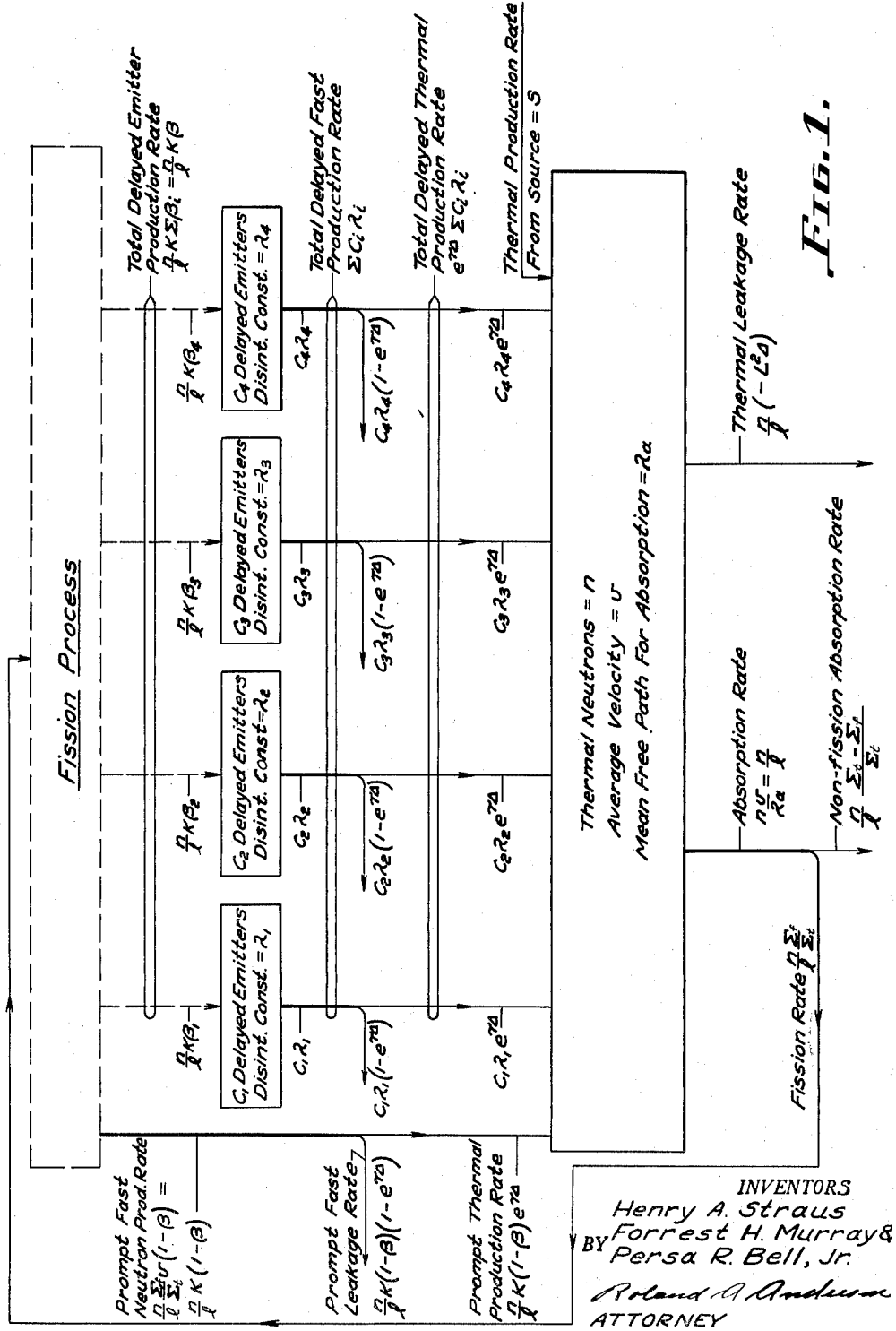
Figure 1 is a diagram showing the rates of occurrence of the various events which take place in a thermal neutron reactor and which lead to the production or loss of neutrons from the reactor. It is useful in explaining the dynamic theory of thermal neutron reactors and in deriving the differential equations upon which the neutron reactor simulator of the present invention is based.

Referring now to Figure 1, the large lower rectangle illustrates any representative portion of the reactor. The instantaneous number of thermal neutrons contained in this representative portion at any time will be represented by the quantity $n$. The rectangle may be considered as the entire reactor, in which case $n$ is the entire number of thermal neutrons present in the reactor, or the rectangle may be considered as an average cubic centimeter of the reactor, in which case $n$ is the average neutron density within the reactor. In any case, the quantity $n$ is proportional to the instantaneous power level of the reactor and varies with time in the same manner as does the power level. The average velocity of these thermal neutrons is represented by $v$ and their mean free path for absorption by $\lambda_a$.

Since the total distance traversed per second by all of the $n$ neutrons is equal to $nv$, and since $\lambda_a$ is the average distance which must be traversed absorbed, then $$\frac{nv}{\lambda_a}$$

is the number of neutrons absorbed per second, that is, the thermal neutron absorption rate. The quantity $l$ will hereinafter be used to designate the ratio $$\frac{\lambda_a}{v}$$

This quantity $l$ is the average lifetime as a thermal neutron of those neutrons which are absorbed. The thermal neutron absorption rate is then $$\frac{n}{l}$$

In order to determine the rate of loss of neutrons as a result of leakage, a mathematical analysis is accordance with diffusion theory may be made. Although such an analysis will not be gone into here, it leads to the result that $-L^2\Delta$ thermal neutrons leak from the reactor per thermal neutron absorbed, and that, of those neutrons which are produced by fission at fission energies, a fraction $(1-e^{\tau\Delta})$ is lost to the reactor by leakage during the process of slowing down to thermal energies. In the above expressions, L is the diffusion length for thermal neutrons (a measure of the net crow-flight distance a thermal neutron travels before being absorbed); $\tau$ is the "Fermi age" (a measure of the square of the net crow-flight distance traveled by a neutron while being slowed down from fission to thermal energy); and $\Delta$, a minus quantity referred to as the reactor Laplacian, is a measure of the poorness of the reactor geometry (size and shape) from the standpoint of leakage of neutrons out of the reactor. Since $-L^2\Delta$ thermal neutrons leak from the reactor per thermal neutron absorbed, the thermal leakage rate is $$\frac{n}{l}(-L^2\Delta)$$

Of those thermal neutrons which are absorbed, a fraction $$\frac{\Sigma_f}{\Sigma_t}$$

produce a fission, while the remaining fraction $$\frac{\Sigma_t-\Sigma_f}{\Sigma_t}$$

is lost to the chain reaction in a non-fission absorption process. In these expressions, $\Sigma_t$ is the total macroscopic absorption cross section and $\Sigma_f$ is the macroscopic absorption cross section for fission. Accordingly, the fission rate is equal to $$\frac{n}{l}\frac{\Sigma_f}{\Sigma_t}$$

while the rate of loss of thermal neutrons by way of non-fission absorption is equal to $$\frac{n}{l}\frac{\Sigma_t-\Sigma_f}{\Sigma_t}$$

The average number of new neutrons ultimately produced at the high fission energy as a result of a single fission will be represented by the quantity V. Of these fission neutrons, a small fraction $\beta$ is produced in potential form, that is, as fission product delayed emitters each of which will eventually emit a high energy delayed neutron. The remaining fraction of fission neutrons $(1-\beta)$ is produced immediately as prompt neutrons. The rate of production of prompt fission neutrons then is given by the expression $$\frac{n}{l}\frac{\Sigma_f}{\Sigma_t}v(1-\beta)$$

or substituting K for the quantity $$\frac{\Sigma_f}{\Sigma_t}v$$

by the expression $$\frac{n}{l}K(1-\beta)$$

The rate of production of delayed emitters of all types is $$\frac{n}{l}K\beta$$

It will be apparent that K, referred to as the multiplication constant for the reactor, represents the number of new thermal neutrons which would ultimately result from one thermal neutron absorption upon the assumption that the pile is infinite in extent, that is, upon the assumption that there is no leakage loss.

From the previously referred to results of the analysis of leakage loss during the slowing down process, the rate of leakage loss of prompt neutrons during slowing down is equal to $$\frac{n}{l}K(1-\beta)(1-e^{\tau\Delta})$$

Therefore, the rate of production of thermal neutrons as a result of slowing down of prompt neutrons is equal to $$\frac{n}{l}K(1-\beta)e^{\tau\Delta}$$

It has previously been stated that a fraction $\beta$ of all neutrons which ultimately result from each fission is temporarily stored in the form of delayed emitters, the total delayed emitter production rate of all types being $$\frac{n}{l}K\beta$$

There are at least five different types or groups of such delayed emitters, each type having associated therewith a characteristic fraction $\beta_i$ and a characteristic disintegration constant $\lambda_i$. The quantity $C_i$ represents the instantaneous number of delayed emitters of the $i$th type present within the reactor. Again, as for the quantity $n$, $o$ may be considered as the average delayed emitter density, rather than the total number of delayed emitters present in the reactor, if desired.

Although all of the delayed emitter types may be taken into consideration in the design of the reactor simulator, if desired, it was found worthwhile from an accuracy standpoint to take into account only those four types having the smallest disintegration constants $\lambda$ (the longest half-life), the remaining types being treated as prompt neutrons. Accordingly, in the diagram only four delayed emitter groups are illustrated.

Considering in detail just the $i$th group of delayed emitters and their associated delayed neutrons as representative of all groups, the instantaneous rate of formation is equal to $$\frac{n}{l}K\beta_i$$

The instantaneous rate of production of delayed neutrons of this type is equal to $C_i\lambda_i$. Since it can be assumed to a close approximation that the delayed neutrons are emitted at fission energies, the instantaneous rate of leakage during slowing down is equal to $C_i\lambda_i(1-e^{\tau\Delta})$, and the instantaneous rate of appearance of thermal neutrons after slowing down is equal to $C_i\lambda_i e^{\tau\Delta}$.

It is apparent that $\Sigma C_i\lambda_i$ represents the total instantaneous production rate of fast delayed neutrons from all types of emitters, and $e^{\tau\Delta}\Sigma C_i\lambda_i$ represents the total instantaneous rate of appearance of thermal neutrons as a result of the slowing down of delayed fast neutrons.

There may also be included within a reactor a non-fission source of neutrons which contributes to the thermal neutrons present in the pile. Such a source is represented in the diagram of Figure 1 as accounting for a production rate of thermal neutrons equal to S.

It should be stated that in the foregoing analysis, two assumptions have been made: (1) that all neutron absorption takes place at thermal energies, and (2) that the neutrons are slowed down from fission to thermal energies in a time so small in comparison with their average lifetime as thermal neutrons $l$ that it can be neglected. Both of these assumptions are very close approximations to the true situation for thermal reactors as we are here concerned with.

Since the instantaneous rate of change of the number of thermal neutrons present in the reactor is equal to the difference between the instantaneous rate of production and the instantaneous rate of loss thereof, the following differential equation may be written:

(1)
$$\frac{dn}{dt} = \frac{n}{l}K(1-\beta)e^{\tau\Delta} + e^{\tau\Delta}\Sigma C_i\lambda_i + S - \frac{n}{l} - \frac{n}{l}(-L^2\Delta)$$

Rearranging terms and simplifying, we obtain:

(2)
$$\frac{dn}{dt} = \frac{n}{l}Ke^{\tau\Delta} - \frac{n}{l} + \frac{n}{l}L^2\Delta - \frac{n}{l}K\beta e^{\tau\Delta} + e^{\tau\Delta}\Sigma C_i\lambda_i + S$$

Equation 2 can be placed in the following form:

(3)
$$\frac{dn}{dt} = \frac{n}{l}e^{\tau\Delta}(K - e^{-\tau\Delta} + L^2\Delta e^{-\tau\Delta}) -$$
$$\frac{n}{l}K\beta e^{\tau\Delta} + e^{\tau\Delta}\Sigma C_i\lambda_i + S$$

Substituting the quantity $\delta$ for the parenthetical expression $(K - e^{-\tau\Delta} + L^2\Delta e^{-\tau\Delta})$, the following basic equation is obtained:

(4)
$$\frac{dn}{dt} = \frac{n}{l}e^{\tau\Delta}\delta - \frac{n}{l}K\beta e^{\tau\Delta} + e^{\tau\Delta}\Sigma C_i\lambda_i + S$$

$\delta$ is commonly referred to as the reactivity or excess reproduction factor of the reactor. Physically, it is equal to the increment in the number of thermal neutrons which ultimately results from the absorption of $e^{-\tau\Delta}$ neutrons. $e^{\tau\Delta}\delta$ is the increment in the number of thermal neutrons which ultimately results from the absorption of one neutron. Disregarding for the moment any non-fission source, it will be apparent that when the reactivity $\delta$ is equal to zero, the reactor is just critical, and the power level will remain constant after sufficient time has elapsed for the delayed emitters to have attained their equilibrium concentrations. If the reactivity $\delta$ is positive, the power of the reactor must ultimately rise, and if the reactivity is negative, the power level must ultimately fall.

The significance of each of the terms on the right hand side of Equation 4 may be seen by reference to the diagram of Figure 1. The first term would give $$\frac{dn}{dt}$$

directly if there were no non-fission source S and, if all fission neutrons were emitted as prompt neutrons. In other words, the first term treats the delayed neutrons incorrectly as prompt neutrons. This would lead to the correct result only when the delayed emitters had attained their equilibrium concentration, that is, when the second and third terms were equal. The second and third terms together correct for the error present in the first term when equilibrium conditions of the delayed emitters do not obtain. The second term is equal to that part of the first term which is contributed to it by the delayed neutrons which are treated as prompt neutrons in the first term. The first two terms together then take into account all losses of thermal neutrons and all production of thermal neutrons from the slowing down of prompt neutrons. The third term constitutes the actual production rate of thermal neutrons from the slowing down of delayed neutrons, and the fourth term, of course, constitutes the production rate of thermal neutrons from any non-fission source which may be present in the reactor.

Similarly, the instantaneous rate of change of the number of delayed emitters of each type may be equated to the rate of production of such delayed emitters minus the rate of decay thereof, as follows:

(5)
$$\frac{dC_i}{dt} = -C_i\lambda_i + \frac{n}{l}K\beta_i$$

Equations 4 and 5 are the basic equations upon which the theory and operation of the reactor simulator device are predicated.

The overall object of the device is to provide an output voltage which is at all times proportional to the neutron density $(n)$, and the time variations of which depend upon specific circuit parameters in the same manner as the time variations of the reactor neutron density depend upon corresponding reactor parameters. Thus, in Fig. 2, there is provided on lead 1 a voltage which is positive with respect to ground by an amount proportional to the neutron density $(n)$ and on lead 2 an equal negative polarity voltage. A current is thus read on ammeter 3 which is proportional to the neutron density $(n)$.

The pile parameter of main interest is the reactivity $\delta$ since this is the one which will be deliberately varied to control the pile during operation, as by moving control rods. This pile parameter is represented in the instrument by the displacement of slider 4 of variable resistance R9 from its central position. The slider 4 then may be throught of as simulating the pile control rod. When the slider is in its exact central position, $\delta$ equals zero and the pile is just critical. Displacements of the slider above or below the central position correspond to proportional positive or negative values of $\delta$, respectively.

In considering the operation of the instrument, it will first be assumed that the voltages on leads 1 and 2 are in fact proportional to $(+n)$ and $(-n)$, respectively, and that the potential of point P is fixed at ground potential. Since $e^{\tau\Delta}$ and $l$ are both constants, it is apparent that the potential of the slider 4 is proportional to the first term of Equation 4. The slider 4 is connected to the grid of a cathode follower V9, the amplification factor of which is substantially unity. The output of the cathode follower V9, which appears as the cathode potential, is applied across $R_{11}$. Accordingly, the current through $R_{11}$ is also proportional to the first term of Equation 4, and may be written:

(6) $\quad i_{R11} = C_1(\text{1st. term of Equ. 4})$ the proportionality constant $C_1$ depending among other things on the value of $R_{11}$.

The current through R16 is obviously proportional to $(-n)$, and since all the coefficients of $(n)$ in the second term of Equation 4 are constants, this current is proportional to the second term of the equation. We may then write:

(7) $\quad i_{R16} = C_2(\text{2nd. term of Equ. 1})$ the proportionality constant $C_2$ depending upon $R_{16}$.

Figure 2:
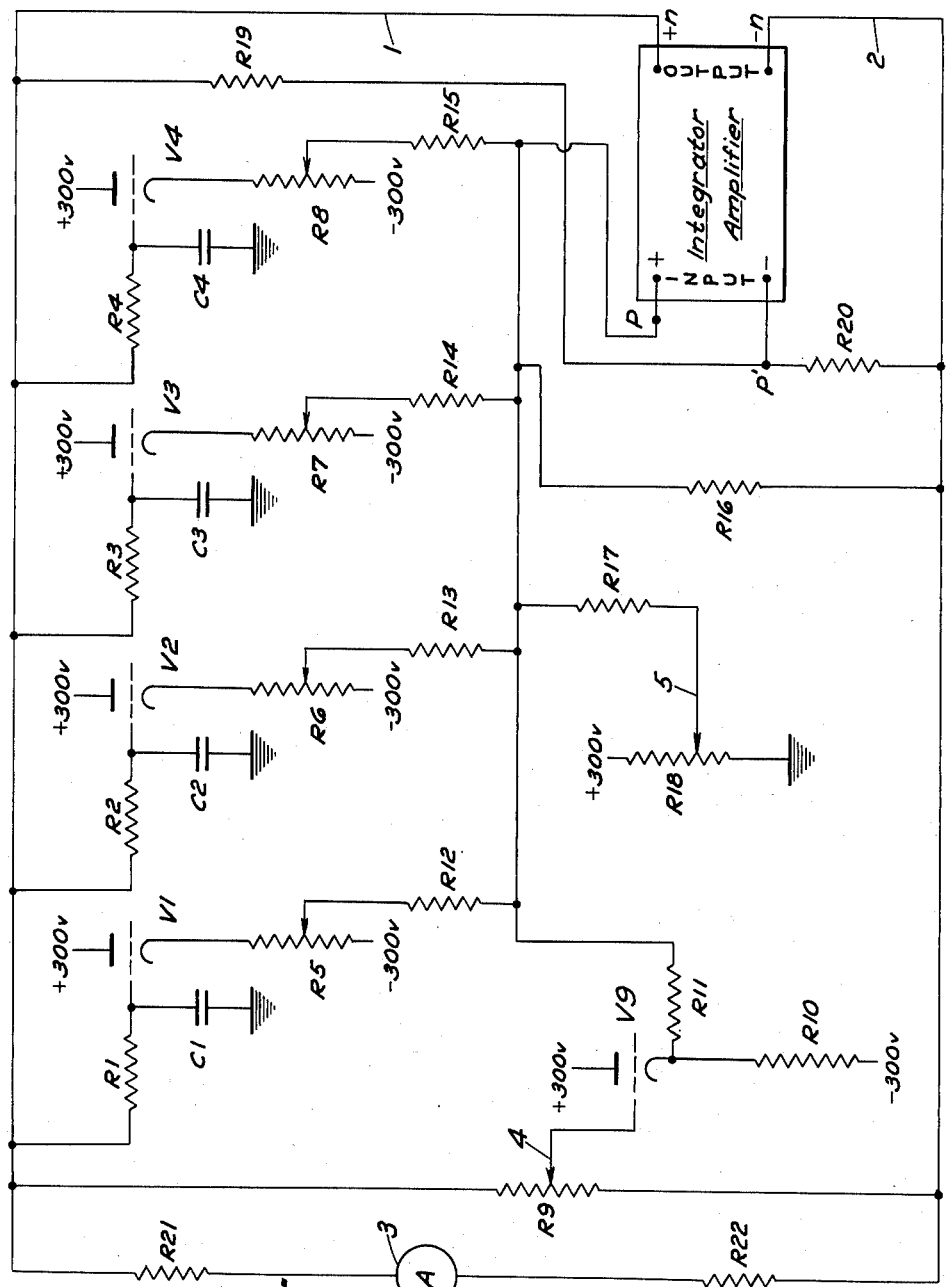
Figure 2 is a wiring diagram of the reactor simulator of the present invention.

The four similar resistance-capacitance series circuits in the upper portion of Fig. 2 are employed to obtain potentials proportional to the number of delayed emitters $C_i$ of each of the four types considered in accordance with the balance Equation 5 for the delayed emitters.

The general equation for these series circuits may be written as follows:

$$(8) \quad n = RC\frac{dV}{dt} + V$$

wherein V is the potential at the upper terminal of the condensers and $n$, of course, is the potential of lead 1.

The values of R1, R2, R3, R4, C1, C2, C3, and C4 are chosen such that $$R1 \cdot C1 = \frac{1}{\lambda_1}; R2 \cdot C2 = \frac{1}{\lambda_2}; \text{etc.}$$

Substituting $$\frac{1}{\lambda_i}$$

for RC in Equation 8 gives:

$$(9) \quad n = \frac{1}{\lambda_i}\frac{dV}{dt} + V$$

Multiplying Equation 9 by $$\frac{K\beta_i}{l}$$

we obtain:

$$(10) \quad \frac{nK\beta_i}{l} = \left[\frac{K\beta_i}{l\lambda_i}\right]\frac{dV}{dt} + \left[\frac{K\beta_i}{l\lambda_i}\right]\lambda_i V$$

The general balance Equation 5 for the delayed emitters may be rewritten in a similar form as follows:

$$(11) \quad \frac{n}{l}K\beta_i = \frac{dC_i}{dt} + \lambda_i C_i$$

From a comparison of Equations 10 and 11, it is clear that the potential V which appears at the upper terminal of the respective condensers C1, C2, C3, C4 is proportional in each case to the number of delayed emitters $C_i$ of the corresponding delay group, the proportionality constant in each case being equal to the quantity $$\frac{l\lambda_i}{K\beta_i}$$

The voltage across condenser C1 is, therefore, proportional to the first term of the summation represented by the third term of Equation 4. This voltage is isolated by means of a cathode follower V1, the output of which is applied across R5. A fraction of this output is then applied across R12. The current flowing through R12 is, therefore, proportional to one of the elements of the summation represented by the third term of Equation 4, the proportionality constant $C_3$ depending among other things on R12. Similarly, the currents flowing through R13, R14, and R15 are proportional to the other elements, respectively, of the summation term, the proportionality constant in each case being made equal to $C_3$ by the proper choice of resistance values of R13, R14, and R15. The total current flowing to point P through resistors R12, R13, R14, and R15 is, therefore, proportional to the third term of Equation 4, the proportionality constant being $C_3$. We may then write:

$$(12) \quad (i_{R12} + i_{R13} + i_{R14} + i_{R15}) = C_3 \text{ (3rd. term of Equ. 1)}$$

Although we have assumed in the above that the output of the various cathode followers is proportional to their inputs, this is not strictly correct by reason of the bias required for the cathode follower tubes. For instance, if we assume for the moment that the slider 4 is at zero potential, then the potential of the cathode of cathode follower V9 will be perhaps a few volts positive to supply the proper grid bias. The cathode follower output voltage is, therefore, equal to the summation of a voltage proportional to the input voltage, and a constant reference voltage. Accordingly, there will be an additional constant current flowing to point P through each of R11, R12, R13, R14, and R15 as a result of the constant reference voltages for the corresponding cathode followers. This current, which is measurable, we will call ($i_{\text{const.}}$).

It is apparent that another current ($i_{R17}$) will flow to point P through R17, the value of which will depend only upon the position of slider 5 and the ohmic value of R17. The current ($i_{R17}$) can be lumped with the constant current ($i_{\text{const.}}$) to obtain a total constant current which is proportional to the constant fourth term of Equation 4, which represents the external source. Thus, we obtain:

$$(13) \quad (i_{\text{const.}} + i_{R17}) = C_4 S$$

The total current ($i_t$) flowing to point P, therefore, may be represented as follows:

$$(14) \quad i_t = C_1\binom{\text{1st. term}}{\text{of Equ. 1}} + C_2\binom{\text{2nd. term}}{\text{of Equ. 1}} + C_3\binom{\text{3rd. term}}{\text{of Equ. 1}} + C_4\binom{\text{4th. term}}{\text{of Equ. 1}}$$

The various circuit elements, which determine the proportionality constants, are chosen such that $C_1 = C_2 = C_3 = C_4$. Then, $$(15) \quad i_t = C_1 \cdot (\text{right-hand side of Equ. 4}) = C_1\frac{dn}{dt}$$

Point P is connected to the input of an integrator amplifier which may be of the type described in P. I. R. E., vol. 35, pages 444–452. As is there described, such an integrator is adapted to produce on its output lead 2 a potential which is at all times proportional to the negative of the time integral of the current flowing into its input. Thus, we may write for the voltage ($E_2$) appearing on output lead 2:

$$E_2 = -C_6\int i_t dt = -C_6\int C_1\frac{dn}{dt}dt = -C_7\int\frac{dn}{dt}dt = -C_7 n$$

Thus, we see that the potential of lead 2 is proportional to the negative of the neutron density, which justifies one of our original assumptions.

Figure 3:
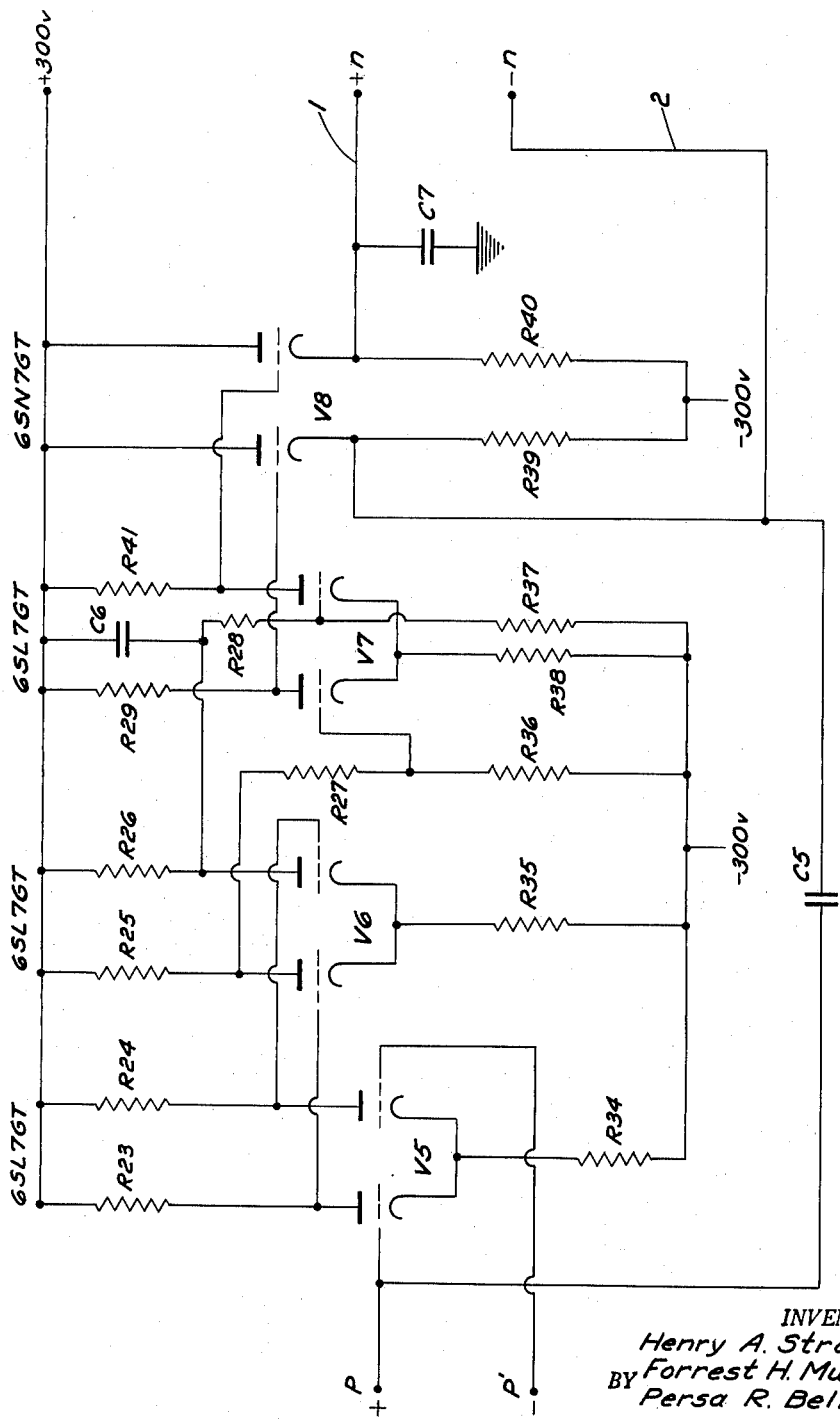
Figure 3 is an internal wiring diagram of the integrator amplifier shown schematically in Figure 2.

The actual integrator amplifier used is shown in Fig. 3. It differs from the one described in the P. I. R. E. reference in that a difference amplifier is employed. Point P is connected to the grid of one side of a duo-triode V5, and point P', which is intermediate equal resistors R19 and R20, is connected to the grid of the other side of the duo-triode V5, both sides of the duo-triode having a large common unby-passed cathode resistance R34. The input voltage signal to the amplifier is the difference between the potentials of points P and P', such a difference creating an unbalance in the plate currents of the two halves of the duo-triode. Several additional stages V6, V7 and V8 of identical balanced amplification are employed so that a very large amplification factor is obtained for the amplifier as a whole. This balanced amplification arrangement increases the accuracy of the instrument and at the same time provides a convenient means of deriving a potential on output lead 1 which is equal and opposite to that on lead 2 and is, therefore, proportional to (n) as required. The negative output is fed back to point P through an integrating condenser C5. Also, a condenser C7 of the same capacity is connected between the positive output lead 1 and ground to provide symmetric loading of the output stage.

Since R19 and R20 are equal, point P' is at ground potential. Also, since the amplification factor of the integrator amplifier is large (of the order of 10,000), the input to the amplifier is extremely small for even the maximum operating value of the output (n). Therefore, point P also remains substantially fixed at ground potential, as originally assumed at the outset of the description.

This latter assumption may be made absolutely correct by introducing a slight inequality between R19 and R20. Thus, it can be seen that if R19 is made slightly greater than R20, point P' will have a slightly negative potential. This inequality can be so proportioned that whatever the amplifier output value (n), the required input signal to produce (n) will be just equal to the amount that P' is below ground potential. Under such circumstances, point P will be exactly at ground potential, making our original assumption absolutely accurate and increasing the over-all accuracy of the instrument. It will be apparent that these circumstances can be maintained only so long as the gain of the amplifier remains constant.

The operation of the device has thus far been described on the basis of the (+n) and (−n) voltages on output leads 1 and 2 being equal and opposite and point P being at ground potential. These conditions are not required for satisfactory operation. If the output voltages on leads 1 and 2 are not exactly equal, point P instead of being at ground potential will assume a new fixed reference potential midway between (+n) and (−n). The overall effect is merely to shift the reference point of the instrument as a whole from ground to a potential midway between (+n) and (−n).

The purpose of the cathode followers is to isolate the prior computing components. The prior components are only accurate in operating as described so long as they draw no current. By introducing a cathode follower, we are able to provide an output which is proportional to the output of the prior computing component but from which a current can be drawn.

Since many changes could be made in the above description and many widely different embodiments of this invention could be made without departing from the scope thereof, it is intended that all matter contained in the above description or shown in the accompanying drawings shall be interpreted as illustrative and not in a limiting sense.

We claim:

1. An electrical neutronic reactor simulator comprising a high gain integrator amplifier having an input signal and an output signal, said output signal being representative of the neutron density of a neutronic reactor, and means responsive to said amplifier output signal for generating said amplifier input signal, said last-named means including potentiometer means connected across said output signal for generating a first component signal proportional to the product of the neutron density and the reactivity of said reactor, at least one series resistance-capacitance circuit connected to said output signal for generating a second component signal proportional to the density of delayed neutron emitters of a given type, means also connected to said output signal for generating a third component signal proportional to the neutron density and having a polarity opposite to that of said second component signal, and means for additively combining said three component signals to obtain said amplifier input signal.

2. An electrical neutronic reactor simulator comprising a high gain integrator amplifier having an input signal and an output signal, said output signal being representative of the neutron density of a neutronic reactor, means responsive to said amplifier output signal for generating said amplifier input signal, said last-named means including potentiometer means connected across said output signal for generating a first component signal proportional to the product of the neutron density and the reactivity of said reactor, at least one series resistance-capacitance circuit connected to said output signal for generating a second component signal proportional to the density of delayed neutron emitters of a given type, means also connected to said output signal for generating a third component signal proportional to the neutron density and having a polarity opposite to that of said second component signal, means for generating a fourth manually controllable component signal independent of said output signal, and means for additively combining said four component signals to obtain said amplifier input signal.

3. An electrical neutronic reactor simulator comprising an integrator amplifier; said integrator amplifier including a difference amplifier train adapted to produce at its output terminals two equal and opposite voltages, and an integrating condenser connected between the positive side of the amplifier input and the negative side of the amplifier output; at least one series resistance-capacitance circuit connected between the positive side of the amplifier output and ground; a voltage divider connected between the opposite sides of the amplifier output, said voltage divider having a manually controllable slider; a resistor connected between the negative side of the amplifier output and the positive side of the amplifier input; and means connecting the condenser of said resistance-capacitance circuit and the slider of said voltage divider to the positive side of the amplifier input.

4. An electrical neutronic reactor simulator comprising an integrator amplifier; said integrator amplifier including a difference amplifier train adapted to produce at its output terminals two equal and opposite voltages, and an integrating condenser connected between the positive side of the amplifier input and the negative side of the amplifier output; a plurality of circuits, each of which comprises a series resistance-capacitance circuit connected between the positive side of the amplifier output and ground, and a cathode follower the grid of which is connected to the ungrounded side of the condenser of said series circuit and the cathode of which is connected through a resistive network to the positive side of the amplifier input; a voltage divider connected between the opposite sides of the amplifier output, said voltage divider having a manually controllable slider; another cathode follower the grid of which is connected to the slider of said divider and the cathode of which is connected through a resistance to the positive side of the amplifier input; and a resistor connected between the negative side of the amplifier output and the positive side of the amplifier input.

5. An electrical neutronic reactor simulator comprising an integrator amplifier; said integrator amplifier including a difference amplifier train adapted to produce at its output terminals two equal and opposite voltages, and an integrating condenser connected between the positive side of the amplifier input and the negative side of the amplifier output; a first resistor connected between the positive side of the amplifier output and the negative side of the amplifier input; a second slightly smaller resistor connected between the negative side of the amplifier output and the negative side of the amplifier input; a plurality of circuits, each of which comprises a series resistance-capacitance circuit connected between the positive side of the amplifier output and ground, and a cathode follower the grid of which is connected to the ungrounded side of the capacitance of said series circuit and the cathode of which is connected through a resistive network to the positive side of the amplifier input; a voltage divider connected between the opposite sides of the amplifier output, said voltage divider having a manually controllable slider; another cathode follower the grid of which is connected to the slider of said divider and the cathode of which is connected through a resistance to the positive side of the amplifier input; a resistor connected between the negative side of the amplifier output and the positive side of the amplifier input; means for providing a manually controllable source of positive potential; a resistance connected between said source and the positive side of the amplifier input; and means for visually indicating the magnitude of the amplifier output.

6. An electrical neutronic reactor simulator comprising an integrator amplifier; said integrator amplifier including a difference amplifier train adapted to produce at its output terminals two equal and opposite voltages, and an integrating condenser connected between the positive side of the amplifier input and the negative side of the amplifier output; a voltage divider connected between the opposite sides of the amplifier output; said voltage divider having a manually controllable slider, and means connecting the slider of said voltage divider to the positive side of the amplifier input.

7. An electrical neutronic reactor simulator comprising an integrator amplifier; said integrator amplifier including a difference amplifier train adapted to produce at its output terminals two equal and opposite voltages, and an integrating condenser connected between the positive side of the amplifier input and the negative side of the amplifier output; a voltage divider connected between the opposite sides of the amplifier output, said voltage divider having a manually controllable slider; and a cathode follower the grid of which is connected to the slider of said divider and the cathode of which is connected to the positive side of the amplifier input.

HENRY A. STRAUS.
PERSA R. BELL, Jr.
FORREST H. MURRAY.

REFERENCES CITED

The following references are of record in the file of this patent:

"Principles of Radar," M. I. T. Radar School Staff, Chapter 2, p. 8, McGraw-Hill Book Co.; 1946.

"Electrical Analogy Methods Applied to Servomechanism Problems"; McCann, Herwald and Kirschbaum; Transactions of the American Institute of Electrical Engineers; volume 65, pages 91–96; February 1946.

"Analysis of Problems in Dynamics by Electronic Circuits," Raggazini, Randall and Russell; Proceedings of the Institute of Radio Engineers; volume 35, No. 5, pages 444–452; May 1947.

"Elements of D.-C. Analog Computers," G. A. Korn; Electronics; pages 122–127; April 1948.

"Design of D.-C. Electronic Integrators," G. A. Korn; Electronics; pages 124–126; May 1948.

"Compact Analog Computer"; Frost; Electronics; pages 116–122; July 1948.

"Electronic Techniques Applied to Analogue Methods of Computation"; G. D. McCann et al.; Proceedings of the I. R. E.; vol. 37, No. 8; pages 954–961; August 1949.